United States Patent
Fike

(10) Patent No.: US 6,632,393 B2
(45) Date of Patent: Oct. 14, 2003

(54) METHOD AND APPARATUS FOR CURING RADIAL TIRES

(76) Inventor: Louis T. Fike, 2905 Fragancia Ave., Hacienda Heights, CA (US) 91745

( * ) Notice: Subject to any disclaimer, the term of this patent is extended or adjusted under 35 U.S.C. 154(b) by 0 days.

(21) Appl. No.: 09/948,398

(22) Filed: Sep. 6, 2001

(65) Prior Publication Data

US 2003/0042656 A1 Mar. 6, 2003

(51) Int. Cl.$^7$ .............................................. B29C 35/02
(52) U.S. Cl. .................... 264/501; 264/297.5; 264/326; 425/34.3; 425/46; 425/195
(58) Field of Search ........................ 425/34.3, 46, 34.1, 425/195; 264/501, 297.5, 326

(56) References Cited

U.S. PATENT DOCUMENTS

| | | | |
|---|---|---|---|
| 1,416,362 A | * | 5/1922 | Lambert ...................... 425/46 |
| 2,333,588 A | * | 11/1943 | Schaevitz .................... 425/46 |
| 3,082,480 A | * | 3/1963 | Balle ............................ 425/46 |
| 3,703,346 A | | 11/1972 | Deboeur et al. |
| 3,741,696 A | | 6/1973 | Greenwood |
| 3,778,203 A | | 12/1973 | MacMillan |
| 3,797,979 A | | 3/1974 | Greenwood |
| 3,806,288 A | | 4/1974 | Materick |
| 3,827,839 A | * | 8/1974 | Pechacek et al. .......... 425/34.3 |
| 3,833,323 A | | 9/1974 | Pasch |
| 3,847,520 A | | 11/1974 | Plumhans |
| 3,854,853 A | | 12/1974 | Mirtain |
| 3,867,504 A | | 2/1975 | Greenwood |
| 4,013,390 A | | 3/1977 | Moeller et al. |
| 4,022,554 A | | 5/1977 | MacMillan |
| 4,025,250 A | | 5/1977 | MacMillan |
| 4,059,375 A | | 11/1977 | Koch et al. |
| 4,174,940 A | | 11/1979 | Pizzorno |
| 4,181,482 A | | 1/1980 | Grawey et al. |
| 4,274,820 A | | 6/1981 | Fike |
| 4,289,463 A | | 9/1981 | Le Moullac |
| 4,553,918 A | * | 11/1985 | Yoda et al. .................... 425/46 |
| 4,563,139 A | * | 1/1986 | Yokoyama et al. ........... 425/47 |
| 4,726,749 A | | 2/1988 | Katsumata |
| 4,741,683 A | | 5/1988 | Hilke et al. |
| 4,957,676 A | | 9/1990 | Greenwood |
| 5,120,209 A | | 6/1992 | MacMillan |
| 5,141,424 A | | 8/1992 | Christof |
| 5,204,036 A | | 4/1993 | MacMillan |
| 5,208,044 A | | 5/1993 | Miyata et al. |
| 5,223,065 A | | 6/1993 | Kogure |
| 5,234,326 A | | 8/1993 | Galli et al. |
| 5,449,483 A | | 9/1995 | Greenwood et al. |
| 5,585,064 A | | 12/1996 | Moris-Herbeuval et al. |
| 5,676,980 A | | 10/1997 | Gulka et al. |
| 5,851,557 A | | 12/1998 | Pouille et al. |
| 6,408,910 B1 | * | 6/2002 | Lagnier et al. ............... 425/46 |

* cited by examiner

Primary Examiner—James P. Mackey
(74) Attorney, Agent, or Firm—Fulwider Patton Lee & Utecht, L.L.P.

(57) ABSTRACT

A method and apparatus for curing large radial pneumatic tires using a plurality of like molds each having top and bottom mold sections provided with radially movable groove-defining tread segments which are automatically extended into a tire to be cured when the molds are positioned within an autoclave and which are automatically retracted when the molds are withdrawn from the autoclave to free the cured tire from its respective mold.

15 Claims, 15 Drawing Sheets

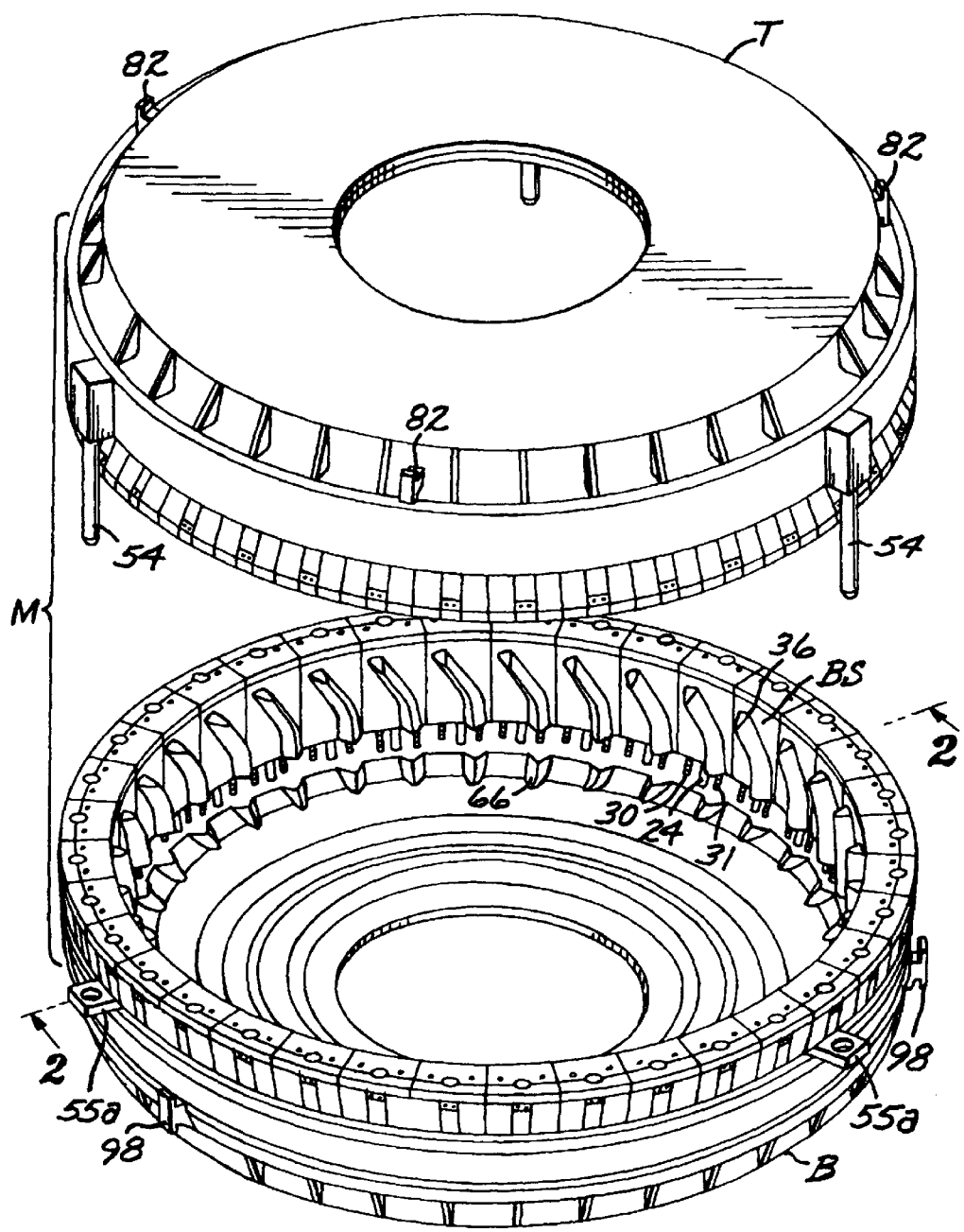

METHOD AND APPARATUS FOR CURING RADIAL TIRES

FIELD OF THE INVENTION

The present invention relates generally to molds required to cure large radial pneumatic tires.

BACKGROUND OF THE INVENTION

It is well known that conventional radial tires run cooler and therefore provide longer service hours than conventional bias-ply tires. The superiority of a conventional radial tire, as compared to a bias-ply tire, results from the provision in a radial tire of substantially inextensible cables arranged in generally radial planes of the tire from one bead to the other bead, with a circumferential belt package of low angle cords (e.g., 5–7 degrees relative to a radial plane of the tire) being secured radially outwardly of such cables. The provision of the cables and the belt package restrains circumferential expansion of a radial tire, and accordingly, the belt package cords do not scissor relative to one another. The radial tire therefore operates at a lower temperature. The conventional bias-ply tire does not utilize a circumferential belt package and instead employs a plurality of cris-crossed plies which extend at relatively large angles relative to a radial plane of the tire. This construction subjects the tire to a heat build-up generated by the tendency of the plies to undergo scissoring relative to one another, and it is well known that excess heat tends to cause delamination and rapid tread wear resulting in a reduced service life.

Tire molds for curing complete tires are generally of two types: full circle molds and segmental molds. In the case of segmented molds, heated exterior components of the mold are moved into contact position with the tread and sidewall portions of the uncured tire and cure the tire from the outside, while a bladder is inflated to contact the inner surface of the tire to help shape the tire, and heating fluids are injected into the inside of the bladder to cure the tire from the inside. An example of a full circle clamshell mold is shown in U.S. Pat. No. 4,957,676 to Greenwood. Full circle clamshell molds are proven, reliable, and lower in cost than segmental molds to manufacture. Another benefit of conventional clamshell molds is that a significant portion of the mold, typically the bottom half, may remain stationary as only the top half needs to be raised and lowered with respect thereto by a molding press, along an axis of rotation of the tire, to open and close the mold. However, clamshell molds are not appropriate for molding radial tires because a radial tire will not expand or contract in diameter and the inner molding surface of the clamshell mold cannot move radially outwardly to receive an uncured tire and radially inwardly to close around a tire casing.

Another type of mold for curing tires is the segmental mold, examples of which are shown in U.S. Pat. No. 5,676,980, to Gulka et al. U.S. Pat. No. 3,787,155 to Zangl, and U.S. Pat. No. 3,806,288 to Materick. Unlike clamshell molds, which are split about the centerline of the tread pattern, segmental molds are radially segmented into a plurality of arcuate tread segments about the circumference of the mold. Each of the segments is attached to a top section of a mold container so that when the top section is lowered and raised by a press in which the container is installed, the mold section correspondingly moves up and down along the axis of tire rotation. In this direction, movement of the top mold section corresponds generally to that of the top portion of a clamshell mold. The fact that a radial tire is not radially expandable or contractible creates serious manufacturing problems when attempting to mold an uncured radial tire in a conventional segmental mold. Segmented molds such as shown in Gulka U.S. Pat. No. 5,676,980, are indicated as being openable to the full outside diameter of a radial tire, but present a serious problem to curing a satisfactory large diameter radial tire (e.g., about 50 inches in diameter), particularly a heavy tire for use on large off-the road vehicles, i.e., unless the mold is used in conjunction with a molding press that maintains the uncured tire in a centered position as the mold closes When the mold is opened to receive a heavy uncured tire there exists a vertical and horizontal gap between the radially outer edge of the lower mold sections' sidewall plate and the radially inner edge of the lower tread segments. Accordingly, as the uncured tire is lowered into the cavity of the lower mold section, the heavy weight of the tire causes the cords of the belt package tire to flex which in turn causes the tire's belt package to be deformed relative to the uncured rubber in which the cords are encased as they encounter the aforementioned gap. Because of such deformation, discontinuities between the belt package cords and the uncured rubber are created, precluding the formation of an integral bond between the cords and the rubber when the tire is cured. As a result, there is a likelihood that delamination of the belt package cords relative to the tire body will occur seriously reducing the service life of the tire. The deformation can be even severe enough to render the cured tire unusable.

SUMMARY OF THE INVENTION

The present invention provides an improved method and apparatus for curing a radial tire within a segmental mold in a conventional autoclave without deforming the cords of the belt package relative to the uncured ruber of the tire. The segmental mold of the present invention includes a top mold section and a bottom mold section. The top mold section is movable with respect to the bottom mold section between a raised open position and a lower closed position. The top and bottom mold sections each contain a plurality of like tread segments arranged in a circular pattern. Each segment is slidably coupled to its mold section by a slanted alignment pin, and two compression springs are positioned on either side of the alignment pin to bias the treads segments outwardly with respect to their respective mold sections. Each of the tread sections is formed with radially inwardly extending tread groove-defining lugs. The bottom mold section is so configured that when the top mold section is in its open raised position, the tread segments of the bottom mold section are arranged radially outwardly of the outer diameter of the uncured tire to be molded. When the top mold section is moved to its closed lower position, the tread segments of both the top and bottom mold sections are automatically moved radially inwardly so that the tread-defining lugs of the segments engage the uncured crown of the tire during curing of the tire. When the tire has been cured, the top mold section is raised and the upper and lower tread segments automatically move outwardly away from the cured tire so such tire can be freely withdrawn from the bottom mold section without the tread segments tearing the tire.

It is a particular feature of the present invention that an uncured tire can be cured in a mold without any deformation taking place between the cords of the bead package and the uncured rubber of the tire thereby precluding the formation of discontinuities between the cords and the uncured rubber surrounding such cords. This feature is accomplished by extending the lower sidewall of the bottom mold section substantially the entire distance from the tire bead area to the periphery of the tread portion of the uncured tire. With this arrangement, the complete sidewall of the uncured tire is supported by the lower sidewall of the bottom mold section and the latter provides a firm platform for the uncured tire without causing a deformation of the belt package of such tire. Additionally, the radially outer portion of the lower sidewall of the bottom mold section is formed with auxiliary lugs that define the lower outer sidewall portion of the treads of a cured tire. The lugs of the tread segments and the lower mold sidewall auxiliary lugs cooperate to form a complete lower tread pattern of a cured tire. The lugs of the upper mold section tread segments and the upper mold sidewall cooperate to form the upper tread pattern of a cured tire.

It is another feature of the present invention that a plurality of the aforementioned molds each containing an uncured tire may be arranged in a conventional autoclave for concurrent curing of the tires. After the tires have been cured the molds are removed from the autoclave and the cured tires withdrawn from their respective molds.

Yet another feature of the present invention is that a single size mold may be utilized to cure tires of varying width.

Further advantages afforded by the method and apparatus of the present invention will become apparent from the following detailed description, when taken in conjunction with the accompanying drawings.

BRIEF DESCRIPTION OF THE DRAWINGS

FIG. 1 is a perspective view of a tire mold embodying the present invention showing the top mold section thereof in a raised open position with respect to the bottom mold section of such apparatus;

DETAILED DESCRIPTION OF PREFERRED EMBODIMENTS

Figure 1A:
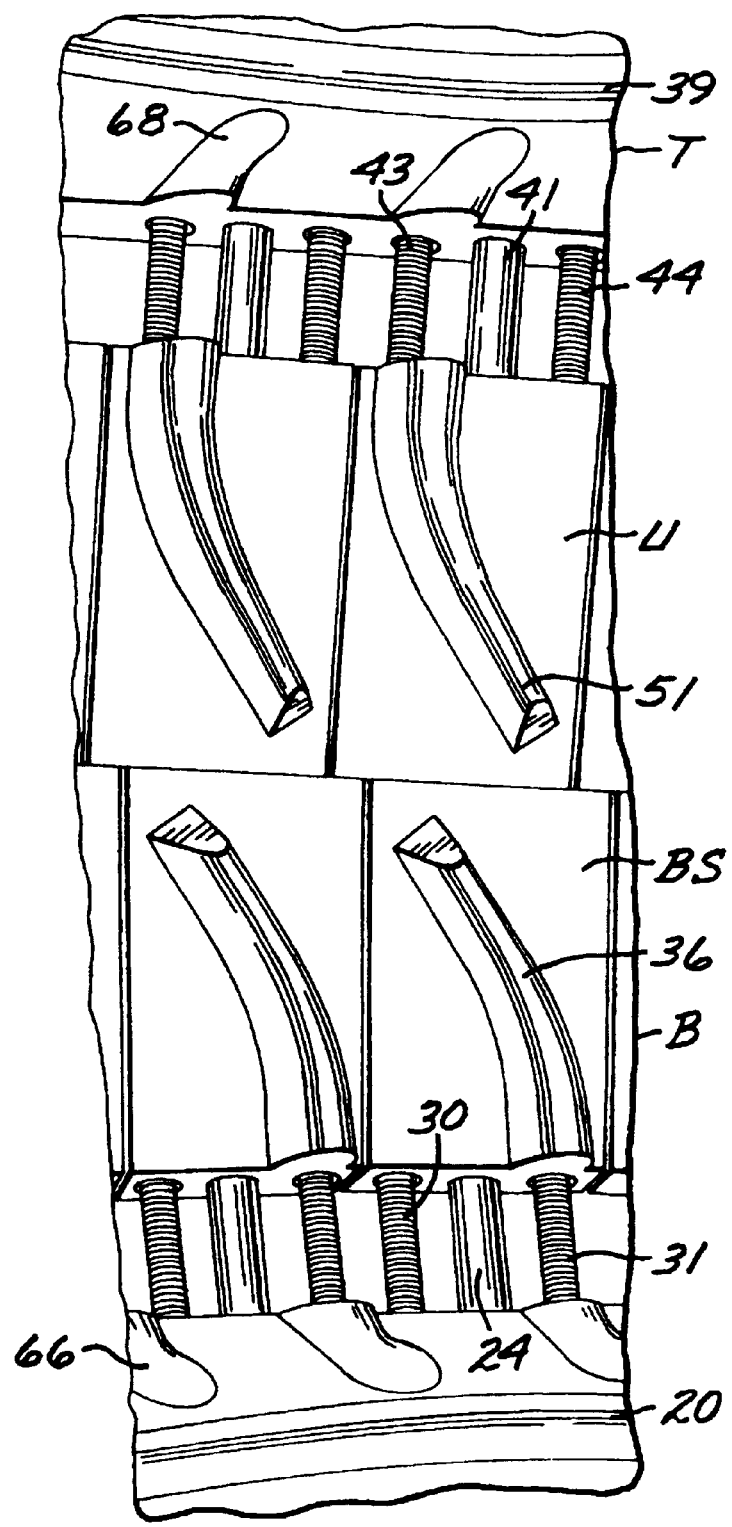
FIG. 1a is a broken side elevation view showing tread segments supported by the top and bottom mold sections.
Figure 2:
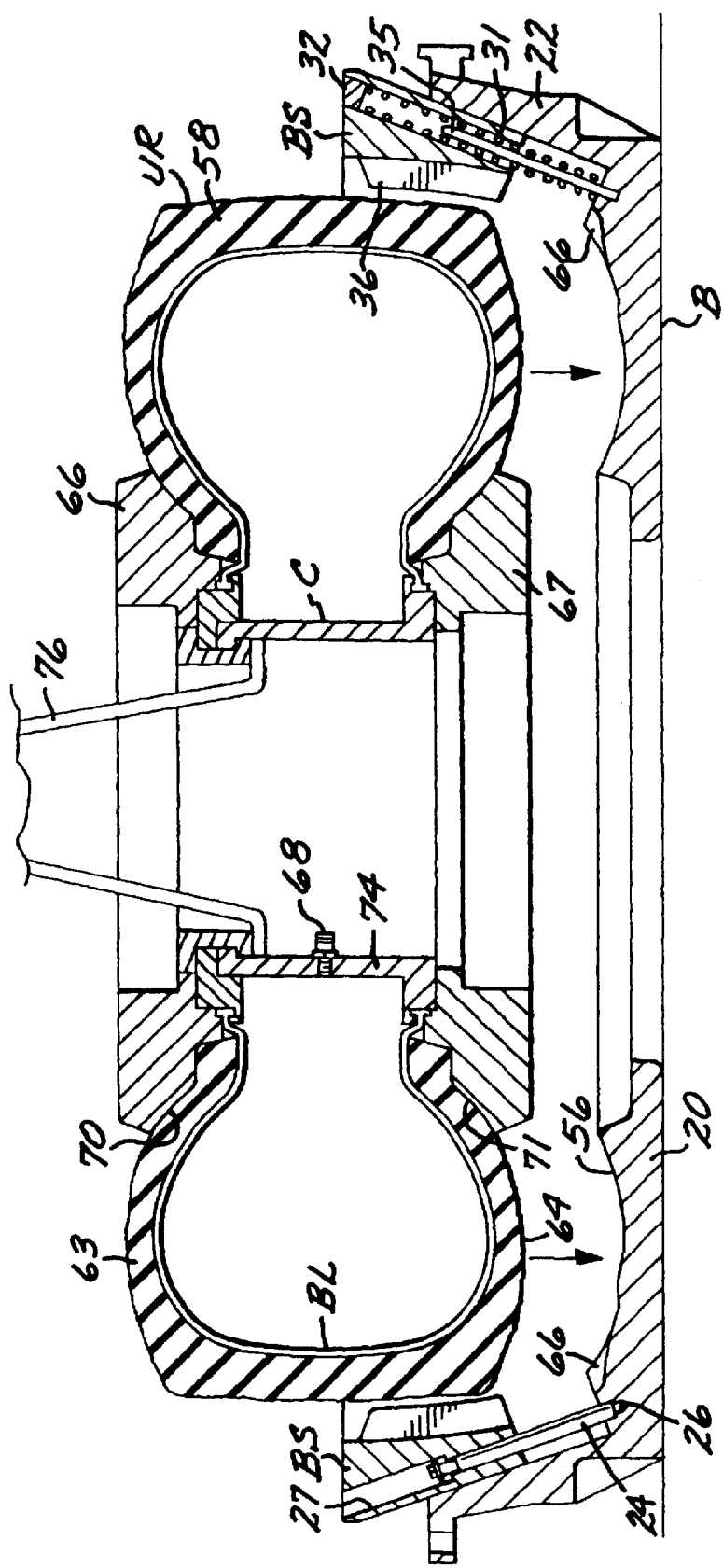
FIG. 2 is a vertical sectional view taken in enlarged scale along line 2—2 of FIG. 1 when a tire to be cured is being lowered into the confines of the bottom mold section.
Figure 3:
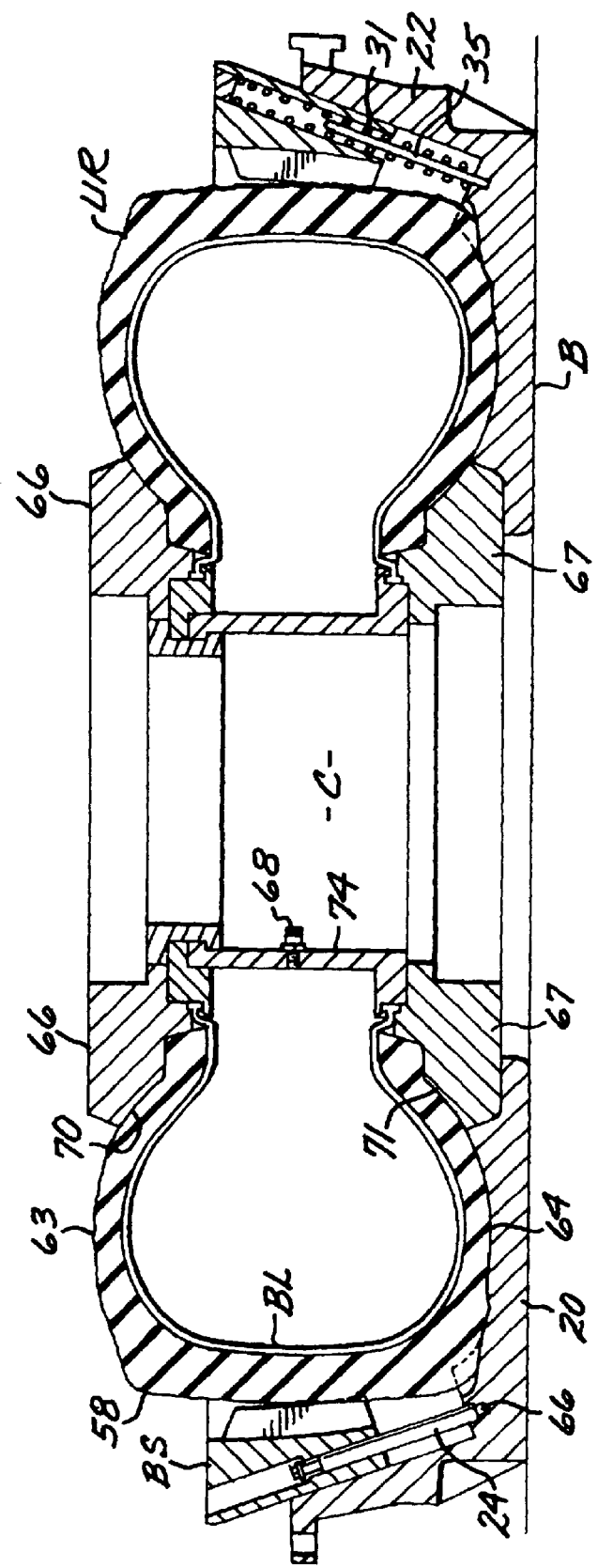
FIG. 3 is a view similar to FIG. 2, showing the uncured tire disposed in the bottom mold section.
Figure 13:
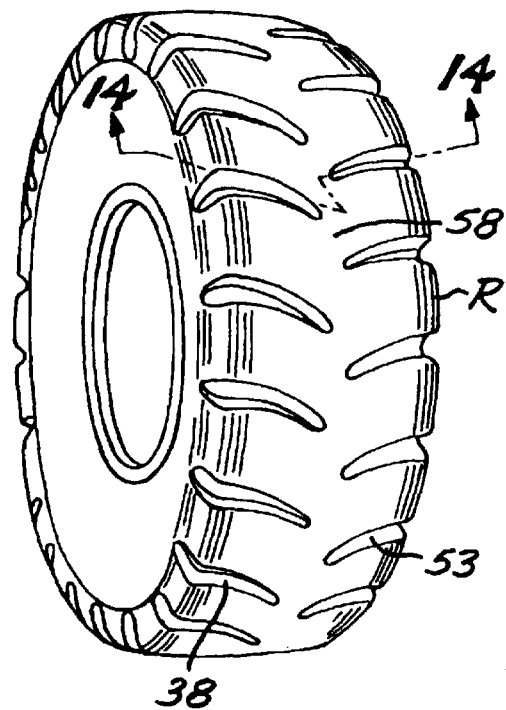
FIG. 13 is a perspective view showing a cured tire made in accordance with the present invention.
Figure 14:
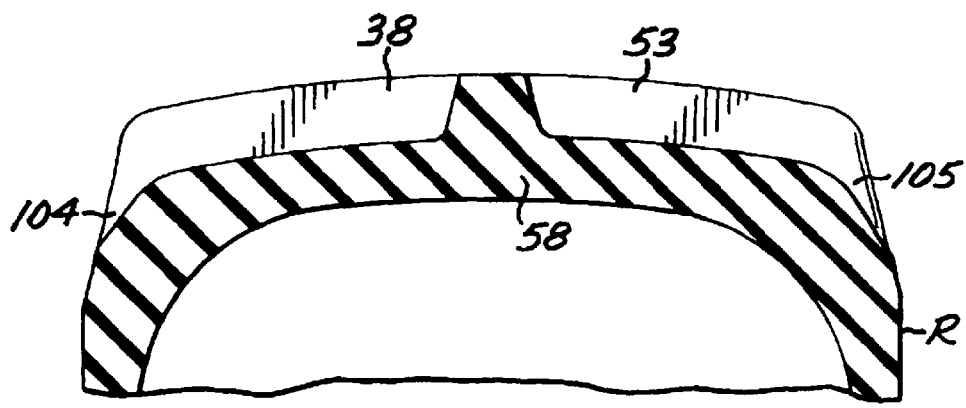
FIG. 14 is a sectional view taken in enlarged scale along line 14—14 of FIG. 13.

Referring to FIG. 1, there is shown a perspective view of a preferred form of tire mold M embodying the present invention for use in curing a radial tire R shown in FIGS. 13 and 14. The entire molding apparatus is generally toroidal in shape, corresponding to the shape of the tire R to be cured therein, and includes a bottom mold section B and a top mold section T. As shown in FIGS. 2 and 3, the bottom mold section B includes a horizontally extending base plate 20 integrally formed with an outwardly and upwardly extending peripheral bowl 22. The bowl 22 encompasses a plurality of bottom tread segments BS of like configuration. Each bottom tread segment is supported by an upwardly and outwardly extending guide rod 24 which is anchored to the base plate 20, as indicated at 26. Guide rods 24 are slidably received in complementary passages 27 in their respective tread segment. A pair of coil compression springs 30 and 31 are disposed on either side of each guide rod, with the upper portion of such coil spring being supported within a cylindrical cavity 33 that is coaxial with its respective spring by a support pin 35. The lower end of each rod is anchored to the mold base plate 20. The radially inner surface of each bottom tread segment is formed with a radially inwardly extending male lug 36 which is adapted to mold the generally horizontally extending portion of the groove 38 defining the left side of the tread pattern of a cured tire R shown in FIGS. 13 and 14.

Figure 4:
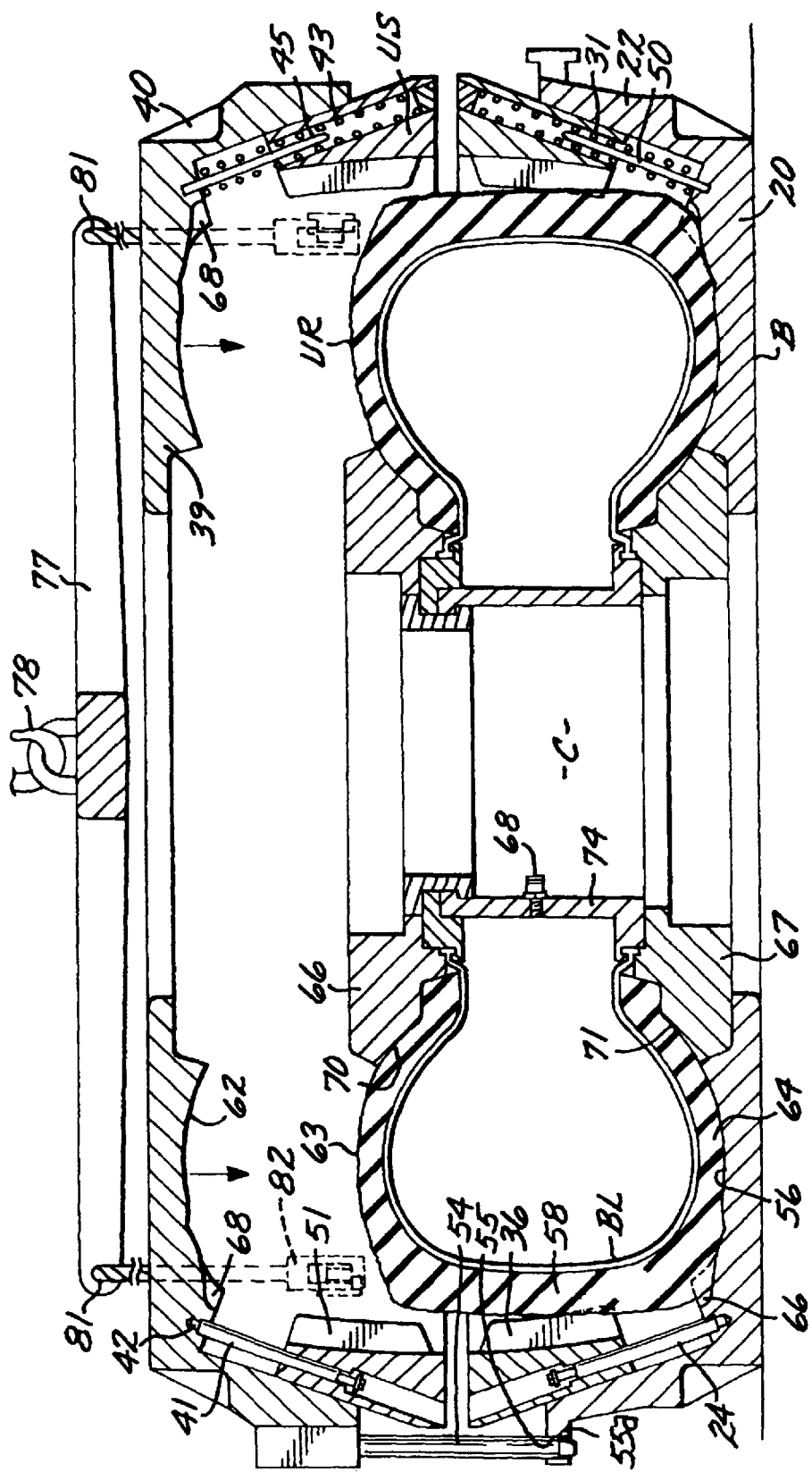
FIG. 4 is a view similar to FIGS. 2 and 3 showing the top mold section being lowered towards its closed position above the bottom mold section.

Referring now to FIG. 4, the top mold section T includes a top plate 39 formed with an integral downwardly and outwardly extending peripheral bowl 40. Bowl 40 supports a plurality of upper tread segments US similar to but mirror images of the bottom tread segments BS. Each upper tread segment is supported for vertical and horizontal movement by a downwardly and outwardly extending guide pin 41, having its upper end anchored to the top plate 39, as indicated at 42. A pair of coil compression springs 43 and 44 are disposed on either side of guide pins 41, with the lower portion of each of such springs being supported within a cylindrical cavity 45, by a rod 50. The lower end of each is secured to the top plate 39. The radially inner facing surface of each upper tread segment US is formed with a radially inwardly extending male lug 51 which is adapted to mold the horizontally extending portion of the groove 53 defining the right side of the tread pattern of cured tire R. The upper and lower mold sections are guided for vertical reciprocal movement by means of a plurality of vertically extending guide bars 54. The upper end of each guide bar is rigidly secured to the bowl 40 of the top plate 39, with the lower end of each guide bar being slidably disposed within a vertically extending bore 55 formed in a peripheral flange 56a of the bottom mold section bowl 22. The top and bottom tread segments US and BS are arcuate and collectively form a circular pattern corresponding to the shape of the tire to be cured when positioned abutting one another. The upwardly-facing side wall surfaces 56 of plate 20 and the downwardly-facing side wall surfaces 62 of top plate 39 form the upper and lower side walls 63 and 64 of the tire to be cured when the top mold is closed on the bottom mold section. Preferably, the mold top and bottom sections are constructed of steel and the top and bottom tread segments are constructed of aluminum.

Referring to FIGS. 1–6, it is important to note that base plate 20 is formed at its outer portion with a plurality of auxiliary lugs 66 that define a downward extension of lugs 36 of each bottom tread segment BS. Similarly, the top plate 39 is formed at its outer portion with a plurality of auxiliary lugs 68 that define an upward extension of lugs 51 of the upper tread segments US. The purpose of such auxiliary lugs is set forth hereinafter.

As indicated in FIG. 2, a tire UR to be cured is supported during the curing process by an annular tire carrier C having complimentary upper and lower bead rings 66 and 67 formed with opposed mirror-image surfaces 70 and 71 that conform to the shape of the bead and inner sidewall portions of a tire to be cured. A conventional inflatable curing bladder BL is sealingly clamped between the bead rings and a vertically extending sleeve 74 that connects the bead rings 66 and 67. Sleeve 74 is provided with a fluid inlet and outlet fitting 68 in a conventional manner.

Figure 5:
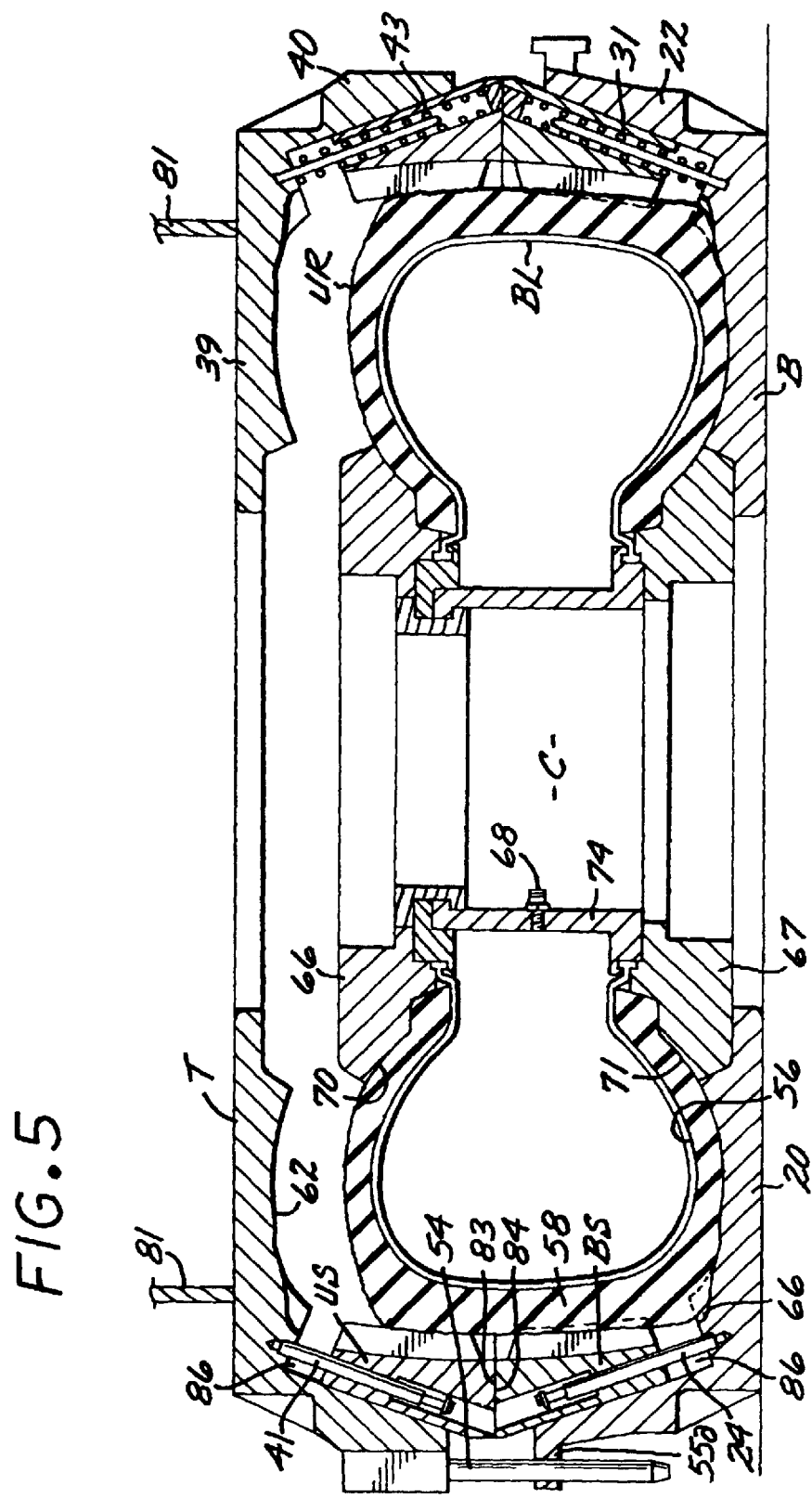
FIG. 5 shows the top mold section in a further lowered position with respect to FIG. 4.
Figure 6:
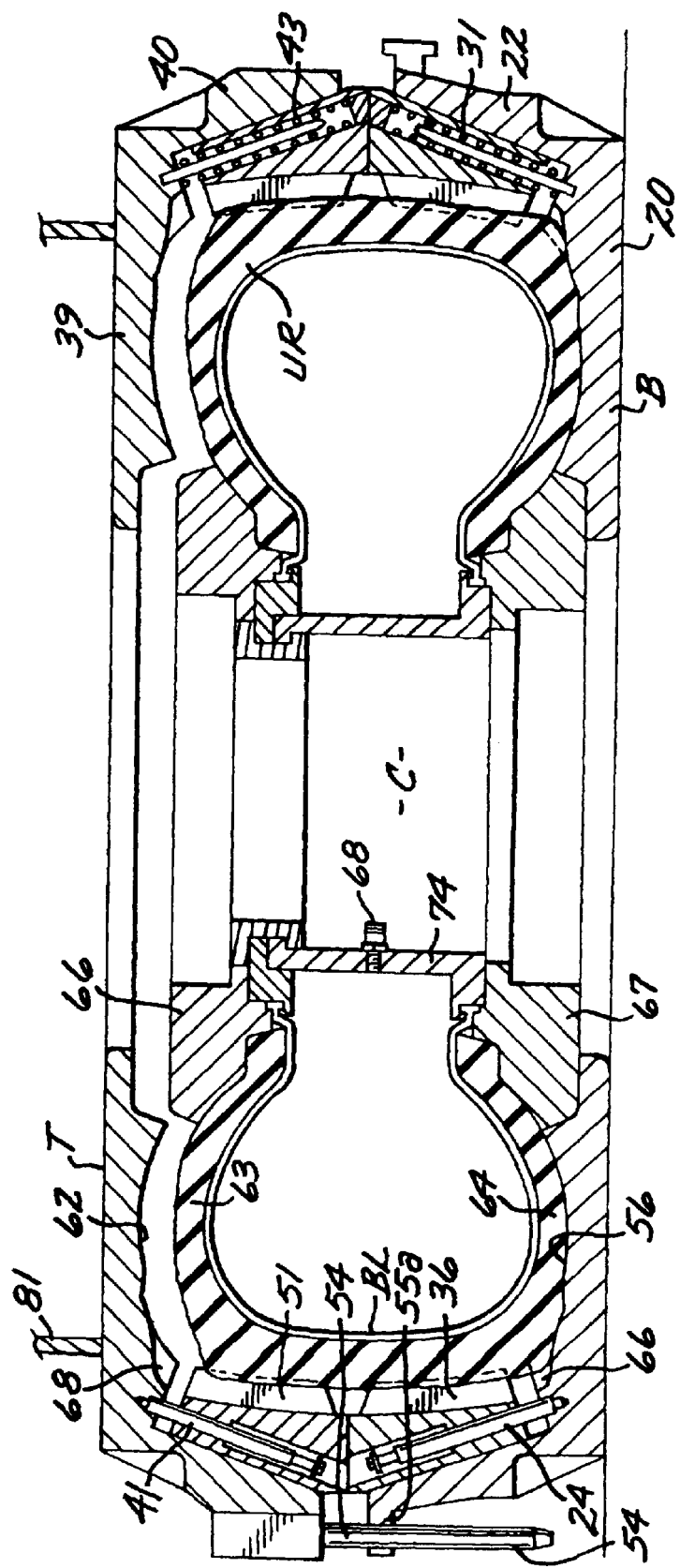
FIG. 6 shows the top mold section in a still further lowered position with respect to the bottom mold section with the mold sections ready to be positioned within an autoclave to cure the tire.

In the operation of the aforedescribed apparatus, referring first to FIG. 2, with the top mold section T removed, a conventional hoist (not shown) lowers the uncured tire body UR into the bottom mold section B by a disengageable connector 76. The uncured tire body is maintained partially inflated at a pressure of about 3 to 6 pounds during the loading process in a conventional manner as by water or air forced into bladder B through fitting 68. At this time, the bottom tread segments BS will be maintained in their uppermost position by springs 31. In this position of the bottom tread segments, the lugs 36 thereof are spaced radially outwardly of the extreme periphery of the uncured tire. Referring now to FIG. 3, the uncured tire body UR is shown resting upon sidewall surfaces 56 of the base plate 20, with the tire lifter 76 removed as indicated in the drawings, the upwardly-facing sidewall surfaces 56 of baseplate 20 extend substantially the entire distance from the tire bead area to the periphery of the tread portion of the uncured tire body UR. With this arrangement the complete sidewall of the uncured tire body is supported by the lower sidewall of the bottom mold section and the latter provides a firm platform for the uncured tire without causing a deformation of the belt package of such tire. In FIG. 4, the top mold section T is shown spaced above the bottom mold section BL, and being lowered towards such bottom section as by a three-leg lifting arm 77 supported by a hoist hook 78. The ends of the bar 77 are each connected to a cable 81, the lower ends of which are releasably attachable to lifting lugs 82 (FIG. 1) formed on the top mold section. Referring to FIG. 5, as the top mold section continues its downward movement the flat lower end 83 of each of the upper tread segments US will engage the flat upper end 84 of each of the bottom tread segments BS. Such engagement causes the top and bottom tread segments to be cammed radially inwardly by the slanted camming surfaces 85 and 86 formed on the bowls 22 and 40 of the top and bottom mold sections. Such radially inward movement of the tread segments forces the lugs 36 and 51 partially into the uncured rubber of the tread portion 58 of the uncured tire. It should be understood that the pliable uncured rubber permits the lugs 36 and 51 to move the uncured casing inwardly while partially forming grooves in the uncured rubber. In FIG. 6, the top mold section T has been further lowered into the confines of the bottom mold section B. It will be noted that the tread segment lugs 36 and 51 have been urged deeper into the uncured rubber of the tread pattern. At this time the complete mold M comprising the top and bottom mold sections will be transferred to the autoclave A shown in FIGS. 7 and 8.

Figure 7:
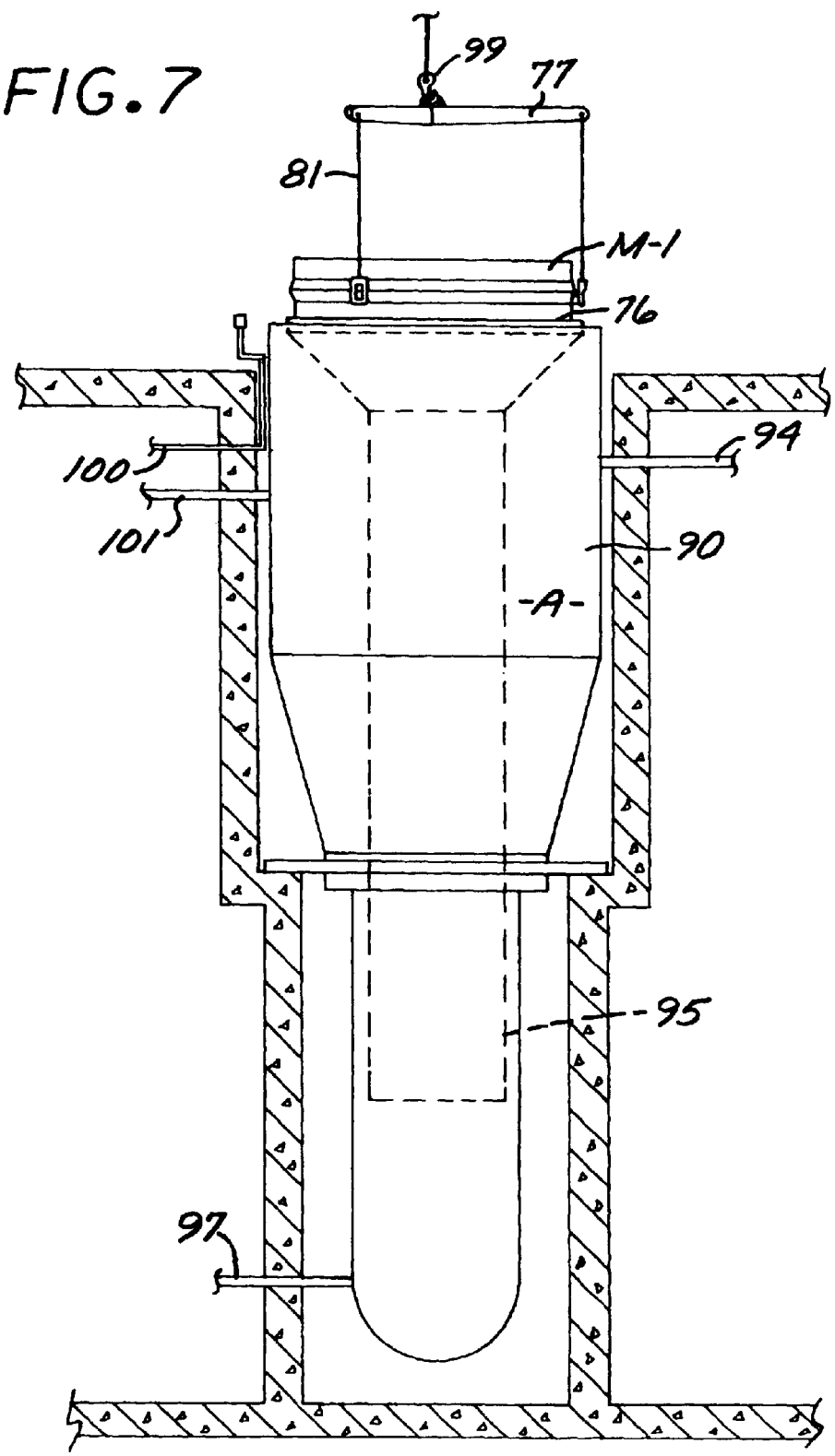
FIG. 7 is a side elevational view showing an autoclave utilized to cure a tire disposed within the mold of FIGS. 1–6, with one of such molds being lowered into the autoclave.

Referring now to FIG. 7, there is shown a conventional autoclave A having a heater shell 90 provided with a removable dome 92. Steam for curing tires in the heater shell is provided by piping 94. A vertically movable fluid-actuated ram 95 arranged within the heater shell is provided at its upper end with a mold support platform 96. A pressurized liquid such as water for operating the ram is provided by piping 97. In FIG. 7, the ram 95 is disposed in its uppermost position to receive one of the aforedescribed complete molds, designated M-1. Mold M-1 is placed upon mold support platform 96 by a three-leg lifting bar 77 such as described hereinbefore, with the three cables 81 having their lower ends releasably attached to lifting lugs 98 formed on bottom mold section B (FIG. 1). Lifting bar 77 is connected to a crane hook 99.

Figure 8:
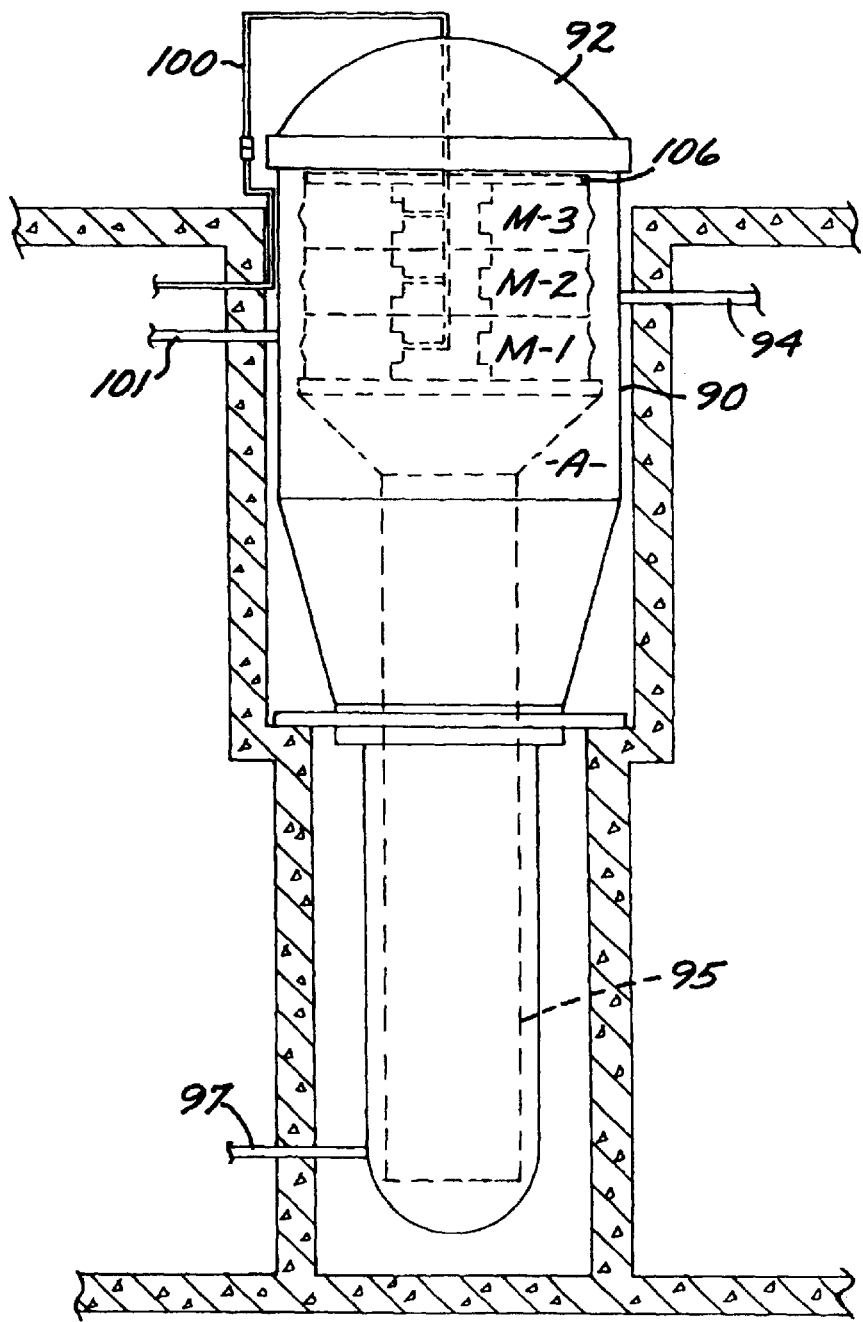
FIG. 8 is a view similar to FIG. 7 showing a plurality of the aforedescribed molds as the tires contained within such molds are being cured.

Referring now to FIG. 8, a plurality, such as two additional molds M-2 and M-3, have been positioned upon mold M-1 after ram 95 has been lowered within heater shell 90. Piping 100 from a hot water source has been connected to the interior of the bladder B of each mold. Dome 92 is then closed and steam at about 125 psi is admitted to the heater shell to heat the molds which effect curing of the uncured tires. Concurrently, hot water at about 350 psi is forced into the bladders to urge the uncured tires firmly against the confines of the mold sections' cavities and also to cure the tires from inside out. Nitrogen can be utilized to increase the pressure within the bladders to about 450 psi. After the tires have been cured (usually about 11 hours), the steam pressure in the heater shell and the water pressure in the bladders is reduced to zero. Cool water can then be sprayed inside the heater shell by piping 101 to reduce the temperature within the molds. Dome 92 is then opened and the ram 95 actuated to lift the molds out of the heater shell.

Figure 9:
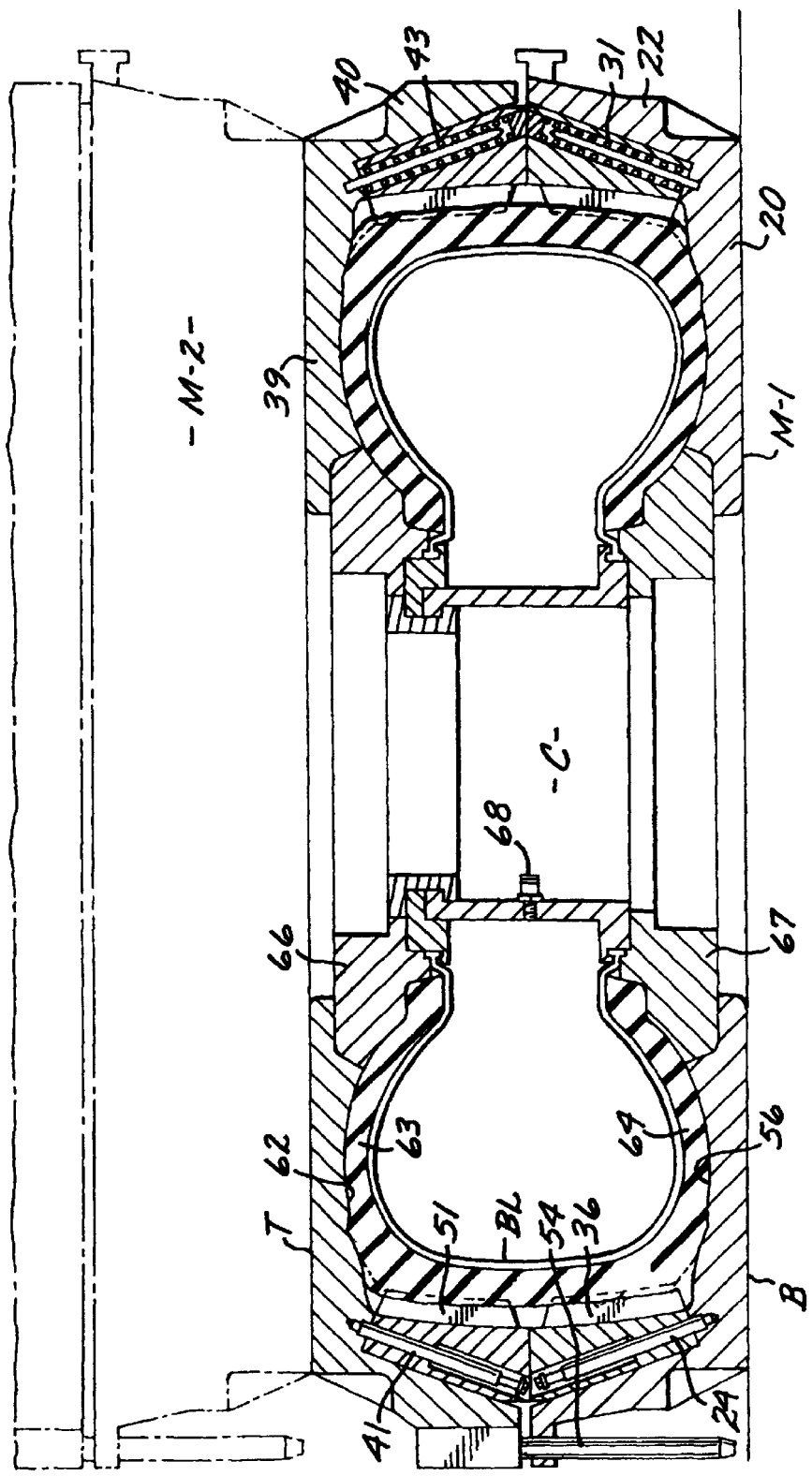
FIG. 9 is a vertical sectional view of two of the molds as a tire is being cured in the autoclave.

Referring now to FIG. 9, it should be noted that the top mold section T of the lowermost mold M-1 will be urged downwardly towards its closed position of this figure by the weight of the second mold M-2 as the latter is positioned upon mold M-1 within the autoclave A. In a similar fashion the weight of the third mold M-3 will partially or completely close the top mold section of the second mold section when mold M-2 is lowered onto mold M-1 within autoclave A.

Final closing of the molds M-1, M-2, and M-3 is effected, however, when the mold sections have been moved upwardly by ram 95 until the top of the uppermost mold M-3 is moved into engagement with the bolster plate 106 formed on the bottom of dome 22. The ram will then squeeze each of the mold sections tightly together under great pressure. This squeezing causes the top mold sections to cam the upper and lower tread segments to US and BS to their radially innermost positions whereby lugs 36 and 51 will be forced into the uncured tread portion 58 of each tire, as shown in FIG. 9, with respect to mold M-1. At the same time the auxiliary lugs 66 and 68 will be forced into the side portions of the tread grooves. Simultaneously, the highly pressurized bladders BL will urge the inside of the uncured tire tightly against the cavities of the top and bottom mold sections while curing the tire from the inside out. In this manner the tread grooves will be formed as the tire cures.

Figure 10:
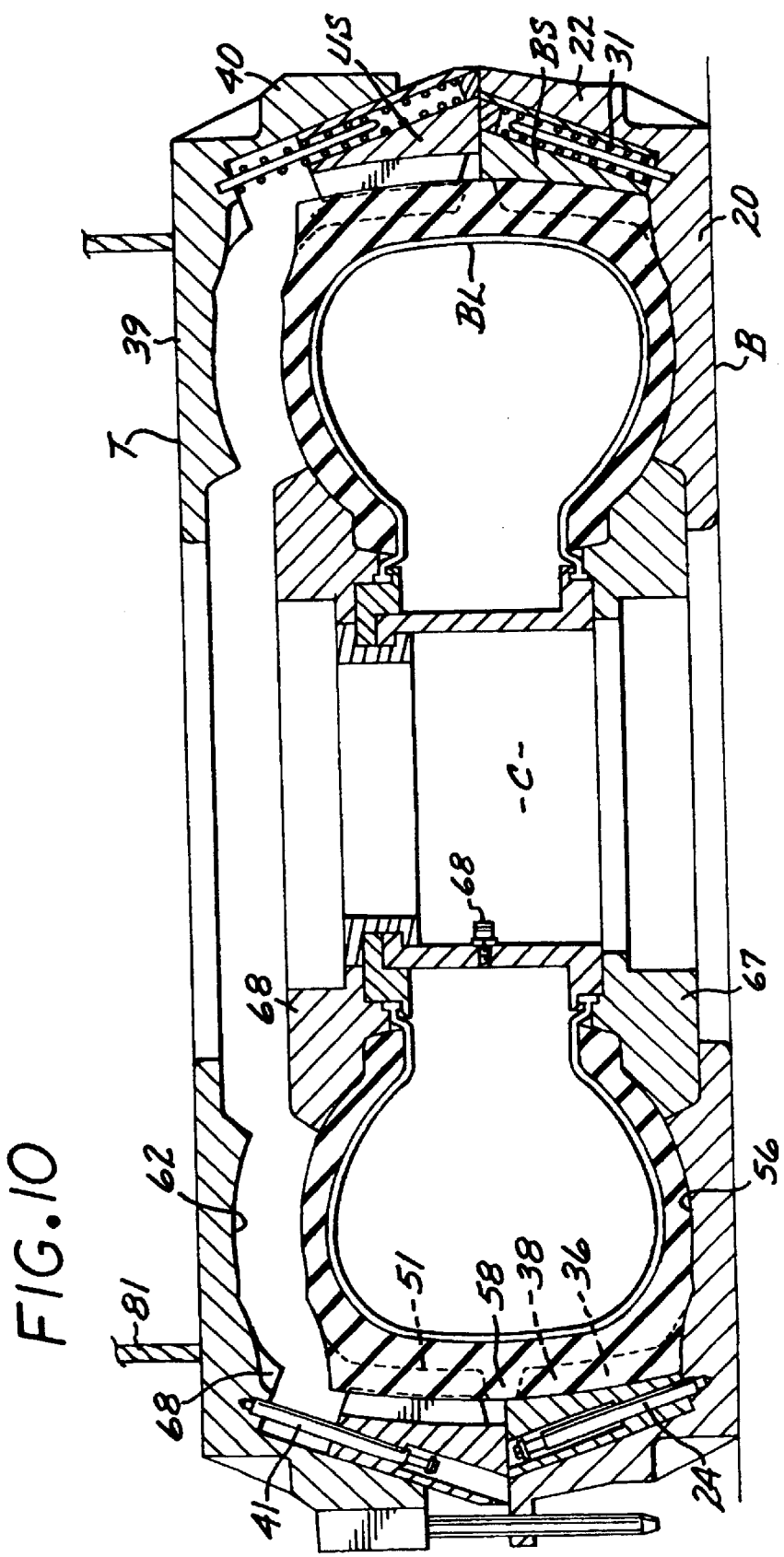
FIG. 10 shows a top mold section being removed from a bottom mold section after the mold has been removed from the autoclave and the tire has been cured.
Figure 11:
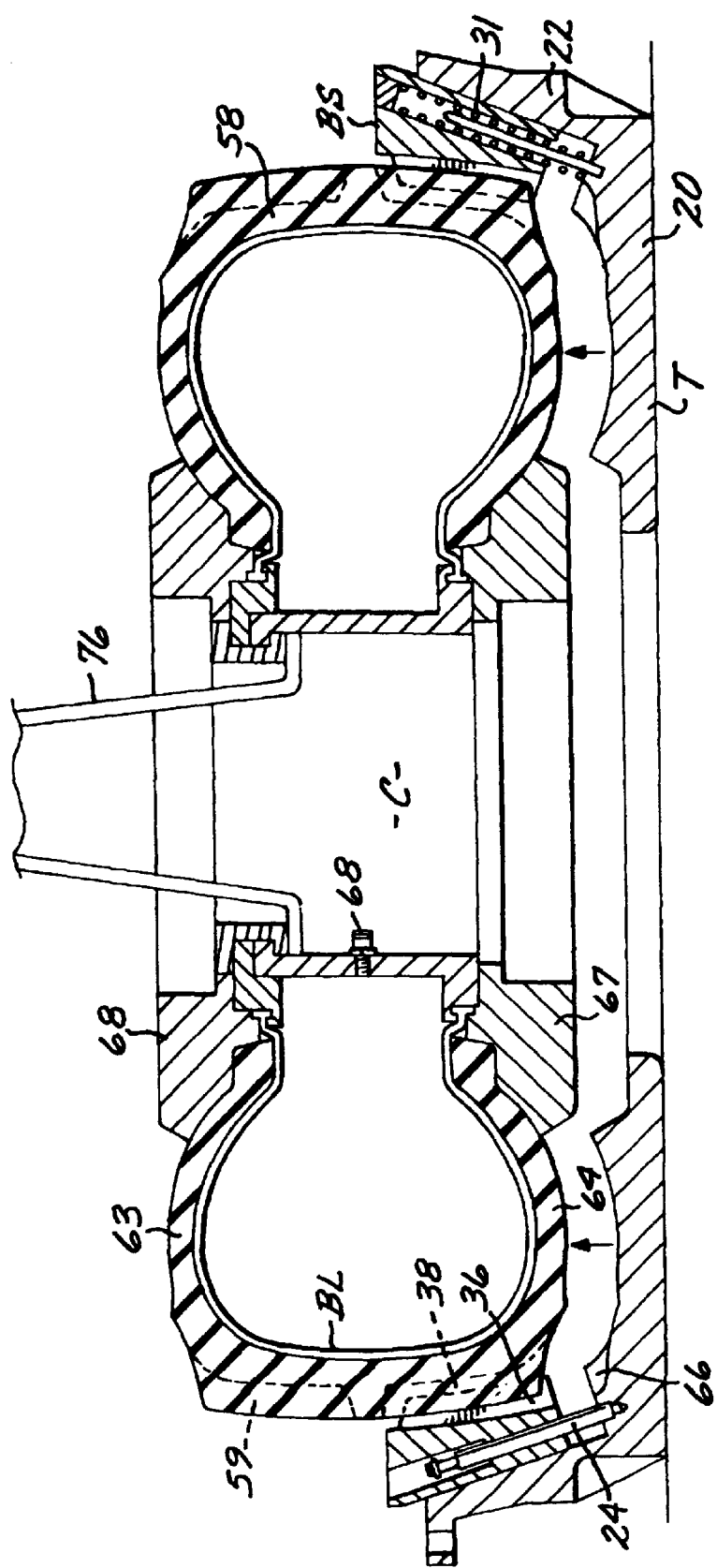
FIGS. 11 and 12 show the top mold section removed and the cured tire being lifted out of the lower mold section while the tread segments are opened radially.
Figure 12:
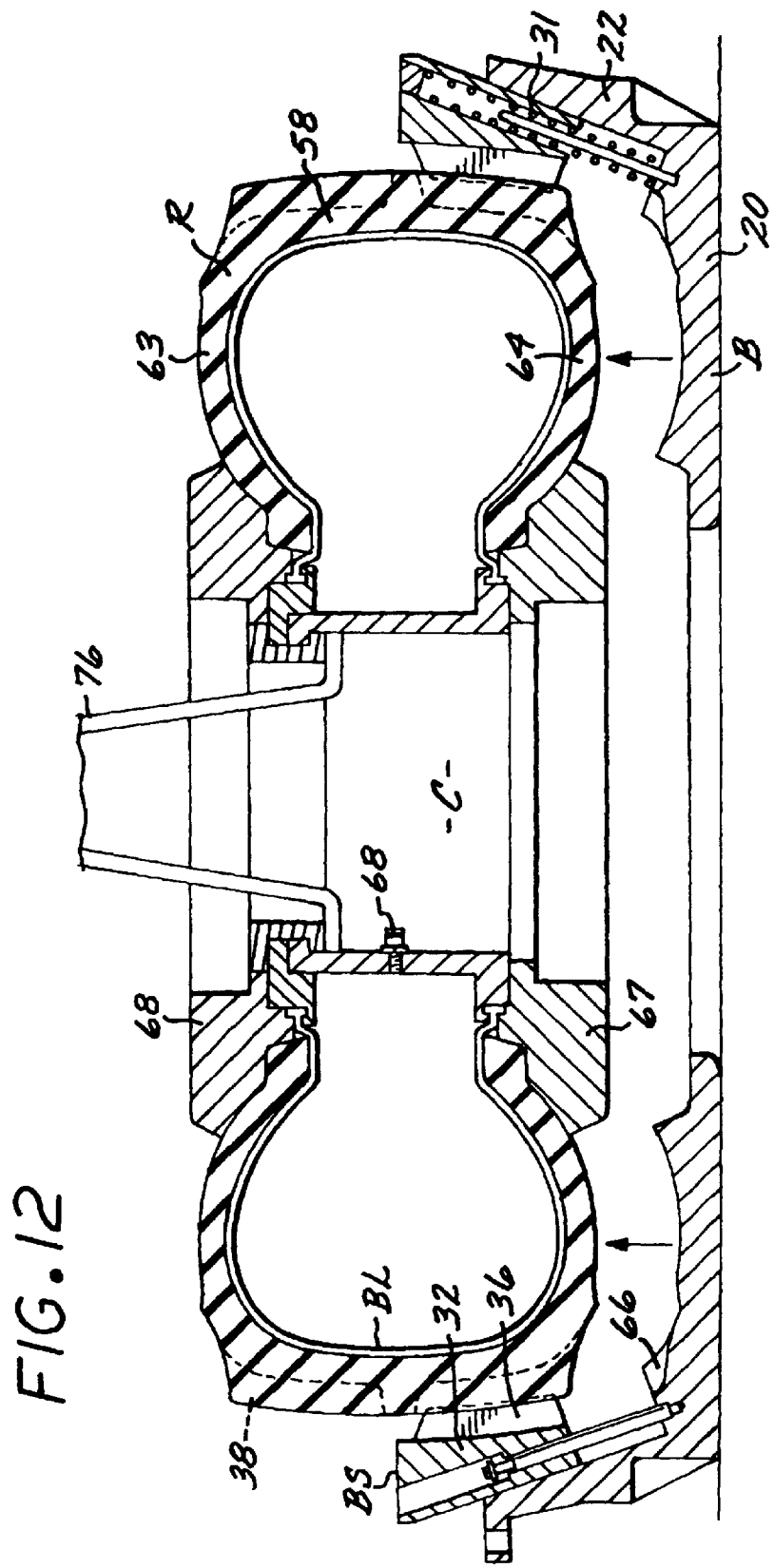

Referring now to FIG. 10, after each mold M has been lifted out of the heater shell 90, its top mold section T will be lifted clear of its bottom mold section B. At this time the weight of the cured tire R and tire carrier C will cause the bottom tread segments BS to remain in their radially innermost position, while the upper tread segments US will retract radially under the influence of springs 43 to the extent that the radially inner surfaces of the lugs 51 will be clear of the outer periphery of the tire tread portion 58. Referring now to FIGS. 11 and 12, connector 76 now raises the cured tire R out of the bottom mold section B. As the tire is moved upwardly, the bottom tread segments BS will be urged radially outwardly and upwardly by springs 31 until the radially inner surfaces of the lugs 32 completely clear the outer periphery of the tire tread portion. Lugs 32 will have formed the horizontal portions 38 of one side of the grooves of the tires tread pattern, while the auxiliary lugs 66 have formed the lower portions of such grooves. It is an important advantage that the upper and lower lugs 36 and 51 will be moved radially out of the tire grooves preventing stripping which could cause the tire rubber to pull loose from the tires' belt package. The cured tire R is then removed from the bladder BL and tire carrier C in a conventional manner and the water allowed to drain from the bladder.

Figure 15:
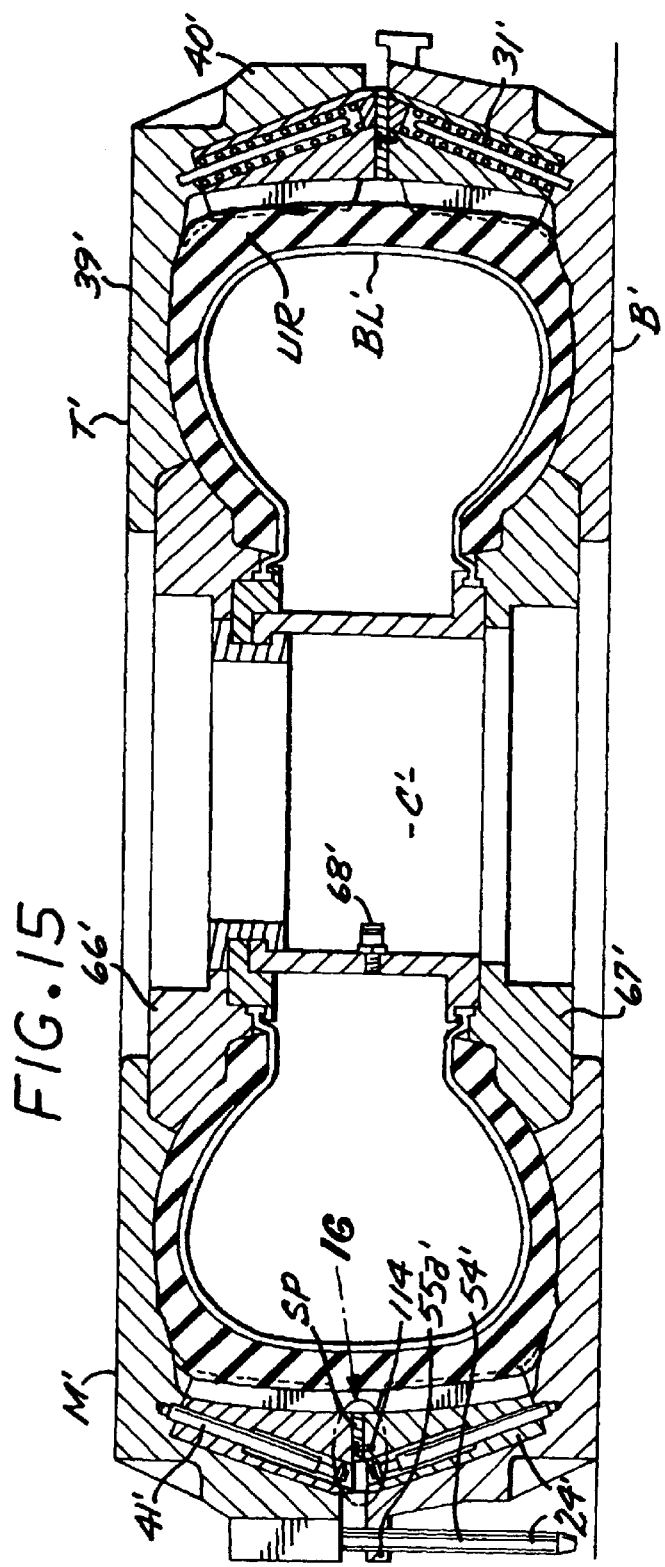
FIG. 15 is a vertical sectional view of a second embodiment of a mold embodying the present invention which may be utilized to cure tires of differing widths.
Figure 16:
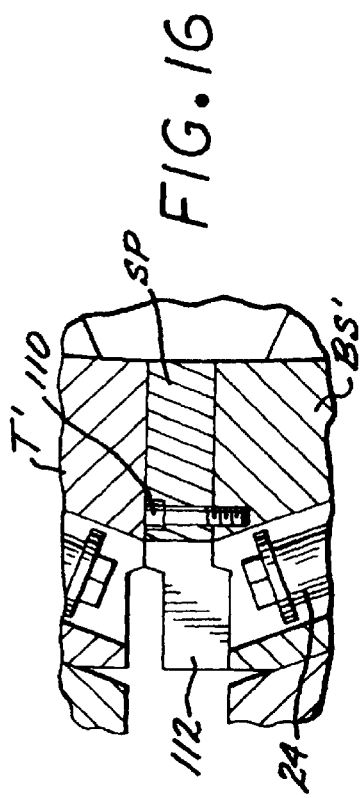
FIG. 16 is an enlarged view of the encircled area designated 16 in FIG. 15.

Referring now to FIG. 15, there is shown a second embodiment of a mold M' embodying the present invention. Like parts in FIG. 15 to those of the aforedescribed embodiment of FIGS. 1–12 bear primed reference numerals. The difference between mold M' and mold M is that a plurality of like spacer plates SP are interposed between the top and bottom mold sections T' and B'. Each spacer plate is releasably secured to bottom mold section B' by a cap screw 110. When spacer plates SP are interposed between the top and bottom mold sections the mold M' can be utilized to cure a tire having a greater width than mold sections T and B of FIGS. 1–12. For example, by interposing the spacer plates between mold sections T' and B', the same mold sections can be converted to cure a wider low profile tire, as compared to a more conventional radial tire. It should be noted that opening 112 permits access to cap screw 114 and its stop-washer for easy removal and cleaning of tread segments BS'.

It should be noted that conventional clamshell molds can be converted to molds embodying the present invention, thereby effecting important cost savings for owners of clamshell molds.

Various modifications and changes may be made with respect to the foregoing description without departing from the scope of the present invention.

What is claimed is:

1. Segmental mold apparatus for curing a radial tire from an uncured rubber tire body having a tire bead area, and upper and lower sidewall portions that extend radially outwardly to a tread portion which encases a multi-cord belt package, said mold apparatus including:
    a top mold section and a bottom mold section, said top mold section being vertically movable with respect to the bottom mold section from a raised open tire body-receiving position to a lower closed tire body-molding position;
    the top mold section and the bottom mold section including upper and lower sidewalls, respectively, which extend substantially the entire distance from the tire bead area to the periphery of the tread portion of an uncured tire body;
    the top mold section supporting a plurality of radially and axially movable top tread segments having tread-defining lugs on their radially inner portions;
    the bottom mold section supporting a plurality of bottom tread segments having tread-defining lugs on their radially inner portions;
    springs interposed between the top mold section and the top tread segments biasing the top tread segments downwardly and outwardly to a position wherein their lugs are disposed outwardly of and adjacent to the periphery of the tread portion;
    springs interposed between the bottom mold section and the bottom tread segments biasing the bottom tread segments upwardly and outwardly to a position wherein their lugs are disposed radially outwardly of and adjacent to the outer periphery of the tire body's tread portion when the top mold section is in its raised position;
    with the lower sidewall portion of the bottom mold section supporting the entire lower sidewall and tread portion of the uncured rubber tire body without any deformation of the cords of the multi-cord belt package when the top mold section is in its raised position;
    camming surfaces on the top mold section which engage the top tread segments thereby forcing the top tread segments downwardly and radially inwardly urging their lugs into tread molding engagement with the tread portion of the uncured tire body as the top mold section is lowered from its raised position towards its closed position, with the top tread segments engaging the bottom tread segments during such downward movement of the top mold section to force the bottom tread segments downwardly and radially inwardly urging their lugs into tread molding engagement with the tread portion of the uncured tire body as the top mold section is lowered from its raised position to its lowered position whereby the lugs of the top and bottom tread segments will form tread grooves in the tread portion of the uncured tire body.

2. Apparatus as set forth in claim 1 wherein the radially outer portions of the top and bottom mold section sidewalls are formed with auxiliary lugs that extend into the radially outer portion of the sidewall portion of the uncured tire body to form tread grooves in such radially outer portion.

3. Apparatus as set forth in claim 1 which further includes spacer plates removably interposed between the top and bottom mold sections whereby the mold apparatus can accommodate tires of varying widths.

4. Apparatus as set forth in claim 1 wherein the tread segments are slidably supported by inclined guide pins that extend from the top and bottom mold sections through their respective tread segments and the springs encompass such guide pins.

5. Apparatus as set forth in claim 1 which further includes an inflatable bladder within the uncured tire body.

6. Apparatus as set forth in claim 2 which further includes spacer plates removably interposed between the top and bottom mold sections whereby the mold apparatus can accommodate tires of varying widths.

7. Apparatus as set forth in claim 4 which further includes spacer plates removably interposed between the top and bottom mold sections whereby the mold apparatus can accommodate tires of varying widths.

8. A method for curing a radial tire from an uncured rubber tire body having a tire bead area, and upper and lower sidewalls that extend radially outwardly to a tread portion that encases a multi-cord belt package, said method including the steps of:
    providing a segmental mold having top and bottom mold sections each having sidewall surfaces which extend radially outwardly substantially the entire distance from the tire bead area to the uncured tire body's tread portion;
    providing top and bottom tread segments for the mold sections which are extendable into groove-forming engagement with the tread portion of the uncured tire;

extending the bottom tread segments upwardly and outwardly to a position radially outwardly of the outer periphery of the tire body's tread portion;

lifting the top mold section to dispose an uncured tire in the bottom mold section radially inwardly of the bottom tread segments;

partially inflating the uncured tire to maintain its shape within the bottom mold section with the belt package extending vertically, and the sidewall surfaces of the bottom mold section supporting the belt package in its generally vertical position without deformation of the belt package with respect to the uncured tire;

positioning the mold within an autoclave;

closing the mold sections by urging the top mold section downwardly onto the bottom mold section;

extending the tread segments radially inwardly and axially into groove-forming engagement with the tire body;

curing the tire body in the autoclave;

removing the mold from the autoclave;

lifting the top mold section from the bottom mold section;

retracting the tread segments away from the periphery of the tire body; and removing the cured tire body from the bottom mold section.

9. A method as set forth in claim 8 which further includes forming auxiliary lugs on the top and bottom mold sections that extend into the radially outer area of such sidewalls.

10. A method as set forth in claim 8 which further includes providing a bladder in the tire body; and partially inflating the bladder before the mold is positioned within an autoclave and admitting hot tire curing fluid to the bladder when the mold is disposed within the autoclave.

11. A method for curing a plurality of radial tires from an uncured rubber tire body having a tire bead area, and upper and lower sidewalls that extend radially outwardly to a tread portion that encases a multi-cord belt package, said method including the steps of:

providing a plurality of segmental molds, each mold having top and bottom mold sections;

forming each mold with sidewall surfaces which extend radially outwardly substantially the entire distance from the tire bead area to the uncured tire body's tread portion;

providing top and bottom tread segments for each of the mold sections which are extendable into groove-forming engagement with the tread portion of an uncured tire;

extending the bottom tread segments upwardly and outwardly to a position radially outwardly of the outer periphery of each tire body's tread portion;

lifting the top mold section to dispose an uncured tire in each bottom mold section radially inwardly of the bottom tread segments;

partially inflating the uncured tires to maintain their shape within their respective bottom mold sections, with the belt package extending vertically, and with said sidewall surfaces of the bottom mold sections supporting its belt package in a generally vertical position without deformation of the uncured tires' belt package with respect to the uncured tire;

positioning the molds within an autoclave in a vertical stack;

closing the mold sections by urging the top mold sections downwardly onto the bottom mold section;

curing the tire bodies of each mold in the autoclave;

removing the molds from the autoclave;

lifting the top mold section from the bottom mold sections of each mold;

retracting the tread segments clear of the outer periphery of the tires; and removing the cured tire bodies from their respective bottom mold sections.

12. A method as set forth in claim 11 which further includes forming auxiliary lugs on the top and bottom mold sections that extend into the radially outer area of such sidewalls.

13. A method as set forth in claim 11 which includes the further step of providing the autoclave with a vertically movable ram that supports the molds and also forming the autoclave with a horizontal abutment on the upper part of the autoclave, and the method further including moving the ram upwardly to engage the top section of the uppermost mold with the horizontal abutment to squeeze the molds together between the top of the ram and the horizontal abutment to thereby secure the top mold sections in their closed positions.

14. A method as set forth in claim 11 which includes the further step of interposing spacer plates between the top and bottom mold sections to increase the width of the tires being cured.

15. A method as set forth in claim 12 which includes the further step of providing the autoclave with a vertically movable ram that supports the molds and also forming the autoclave with a horizontal abutment on the upper part of the autoclave, and the method further including moving the ram upwardly to engage the top section of the uppermost mold with the horizontal abutment to squeeze the molds together between the top of the ram and the horizontal abutment to thereby secure the top mold sections in their closed positions.

* * * * *